(12) United States Patent
Bauchot

(10) Patent No.: US 8,130,956 B2
(45) Date of Patent: Mar. 6, 2012

(54) EFFICIENT AND LOW POWER ENCRYPTING AND DECRYPTING OF DATA

(75) Inventor: Frederic Bauchot, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 12/137,900

(22) Filed: Jun. 12, 2008

(65) Prior Publication Data
US 2009/0060190 A1    Mar. 5, 2009

(30) Foreign Application Priority Data
Aug. 2, 2007   (EP) ..................... 07113715

(51) Int. Cl.
*H04L 9/00* (2006.01)
(52) U.S. Cl. ...................................... 380/268
(58) Field of Classification Search ............... 380/268
See application file for complete search history.

(56) References Cited

U.S. PATENT DOCUMENTS

| | | | |
|---|---|---|---|
| 6,122,379 A | 9/2000 | Barbir | |
| 6,668,325 B1 * | 12/2003 | Collberg et al. | 713/194 |
| 6,760,442 B1 | 7/2004 | Scott | |
| 7,110,539 B1 | 9/2006 | Bao et al. | |
| 2002/0085716 A1 | 7/2002 | Abdulkader | |
| 2005/0063539 A1 | 3/2005 | Langin-Hooper et al. | |

FOREIGN PATENT DOCUMENTS

WO          03104969 A2    12/2003

OTHER PUBLICATIONS

Andrei, S. et al., "About the Collatz conjecture," Acta Informatica, vol. 35, No. 2, 1998, pp. 167-179.
PCT, "Notification of Transmittal of the International Search Report and the Written Opinion of the International Searching Authority, or the Declaration", International Application No. PCT/EP2008/05872, Date of Mailing Feb. 2, 2009.
Jones, "The Collatz Problem: An Iterative Algorithm," pp. 1-12, Mar. 3, 1998, International Baccalaureate Extended Essay, Mathematics.

* cited by examiner

*Primary Examiner* — Kambiz Zand
*Assistant Examiner* — Stephen Sanders
(74) *Attorney, Agent, or Firm* — Andrea Bauer; Hoffman Warnick LLC

(57) ABSTRACT

The present invention relates to the field of computer data encrypting and decrypting, especially for mobile equipments like PDA, mobile phones, smart cards and the like, which need a good trade-off between computing speed, power consumption and security strength. Embodiments of the invention provide encrypting/decrypting methods implementing simple data operation. Such methods are based on generating a pseudo-random sequence through a function of the Collatz (or Syracuse) family from a starting number used as a secret key.

21 Claims, 4 Drawing Sheets

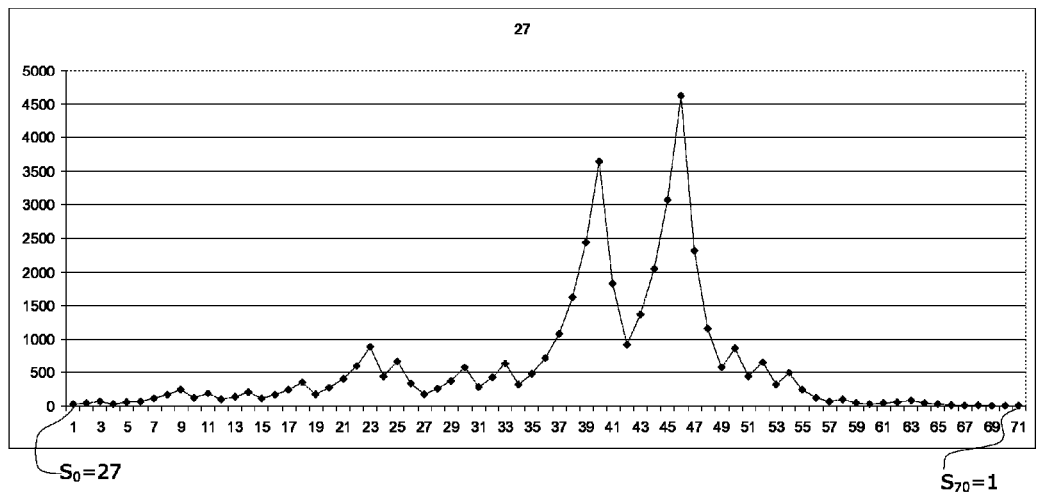
Fig. 4
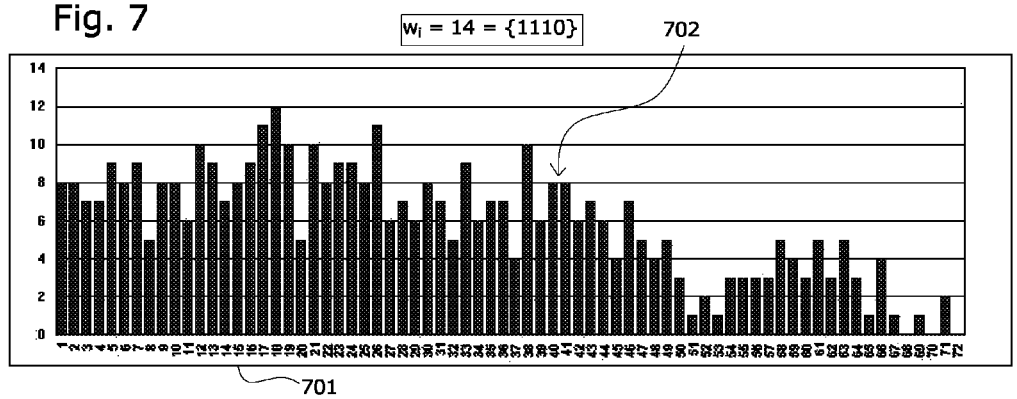
Fig. 5
Fig. 7

EFFICIENT AND LOW POWER ENCRYPTING AND DECRYPTING OF DATA

CROSS REFERENCE TO RELATED APPLICATIONS

This application claims the benefit of co-pending European Patent Application No. EP07113715, filed 2 Aug. 2007, which is hereby incorporated herein.

FIELD OF THE INVENTION

The present invention relates to the field of computer data encrypting and decrypting, especially for compact or low performance or power devices such as smartcards or nomad and mobile computerized objects.

BACKGROUND OF THE INVENTION

In encryptography, more and more processing power is required to encipher or decipher texts or data. This often calls for dedicated "hardware assist" components which need substantial computer resources (memory, CPU cycles) which themselves ask for significant energy sources. On mobile equipment such as PDAs, mobile phones, smart cards and the like, it is desirable to have systems which present a good trade-off between power consumption and security strength.

SUMMARY OF THE INVENTION

In one embodiment, the invention comprises processing at least one pseudo-random sequence of numbers generated from at least one first key for encrypting or decrypting data. Generation of this pseudo-random sequence of numbers comprises an iteration of a function termed pseudo-random function, which is defined as comprising the following steps: testing a determined test condition on a first number from this sequence; in at least a first case of said test condition, applying on said first number a first operation; in at least a second case of this test condition, applying on this first number a second operation; using result of this first operation or second operation for obtaining a second number, this second number taking place in this sequence after this first number.

First and second operations are two different arithmetical functions. They are selected so as, for at least one of these two operations, when a first number is processed through such operation issuing a second number, the result of the test condition on the second number is not systematically identical to the result of the test condition on the first number. Preferably, both first and second operations are selected under such a condition.

As an example, if the test condition is a parity test, any function which may never cause a parity change cannot be chosen as such an operation. Thus, adding an even number or multiplying with an even number may not be selected as such an operation. This potential change of test condition between first and second number of the pseudo-random sequence is a factor for a more randomly distributed sequence.

Preferably, the invention proposes to generate the second number through a function of the Collatz type, as defined hereafter. In a preferred embodiment, the first number is an integer and the step of checking the test condition comprises calculating parity of this first number. Parity computing is quite simple and fast done in binary circuits, and enables good performance with low complexity and power consumption.

In alternative embodiments, the test condition may comprise calculating a value of this first number under a modular equality. As an example, the method according to the invention may involve three cases and three operations, depending on a test condition of equality modulo 3.

According to embodiments of the invention, the pseudo-random sequence of numbers is used for encrypting or decrypting binary data, through a method comprising the following steps: generating the pseudo-random sequence of numbers from a first key data, termed starting number, treated as an initial first number for this pseudo-random sequence of numbers; processing this pseudo-random sequence of numbers through a conversion treatment resulting into a pseudo-random of binary digits; applying a encyphering or decyphering treatment, using this binary pseudo-random sequence as a seed for encrypting or respectively decrypting computer data.

Preferably, first and second operations are chosen such that the result of applying the first operation on the first number is greater than this first number, while the result of applying the second operation on this same first number is lesser than this first number, or reversely. This feature enables the sequence to involve numbers staying relatively low, thus minimizing the need for large binary registers or memories. Also, it combines well with the conversion treatment described hereabove for issuing a more randomly distributed pseudo-random binary sequence. For a better device simplicity and an optimal trade-off between different technical constraints, as well as a better "random quality" or unpredictability of the pseudo-sequences generated, the invention proposes using functions with the following features, as first and/or second operations: applying the first operation on the first number comprises dividing this first number by a determined number greater than one; applying the second operation on the first number comprises multiplying this first number by another number greater than one, the result of which being further added with an odd number.

Furthermore, according to embodiments of the invention, the test condition and first and second operations involve the following features. The step of checking the test condition results in the first case when the first number parity is even. The step of applying the first operation to this first number then comprises dividing this first number by an even integer. Meanwhile, the step of checking the test condition results in the second case when the first number parity is odd. The step of applying the second operation to this first number then comprises multiplying this first number with another integer greater than one, the result of which being then added with one.

Also, the function is selected so as to ensure that the function cannot "loop on itself", meaning that for any starting first number, the function will always, after multiple iterations, converge to the same fixed number.

Alternatively, the method moreover comprises a step of verifying that the function is not looping on itself, e.g. through verifying that the second number was not already obtained in the pseudo-random sequence of numbers.

In the preferred embodiment described hereafter, first and second operations are defined as follows. In the first case, i.e. when first number is even, the step of applying the first operation to the first number further comprises dividing this first number by two. In the second case, I.e. when first number is odd, the step of applying the second operation to the first number further comprises multiplying this first number with three, the result of which being then added with one.

According to the preferred embodiment, the step of encyphering binary data, termed plain data, into encrypted binary data furthermore comprises the following steps: splitting the plain data into a sequence of consecutive binary words, termed word sequence, of a length based on a second key data; generating a sequence of numbers, termed encrypted sequence, from this word sequence, where at least one binary word from this word sequence is replaced with an number representing at least one position containing this binary word within the pseudo-random binary sequence; generating this encrypted binary data from this encrypted sequence.

In the reverse way, the step of decyphering encrypted binary data into decrypted binary data furthermore comprises the following steps: reading this encrypted data into a sequence of numbers, termed encrypted sequence; generating a sequence of binary data words, termed word sequence, from this encrypted sequence, where at least one number of this encrypted sequence is used as an offset for reading, whithin the pseudo-random binary sequence, a binary word the length of which is based on a second key data, this number of this encrypted sequence being replaced with this binary word into this word sequence; concatenating this word sequence into decrypted data.

A computerized device or system is also provided in embodiments of the invention, implementing such encrypting and/or decrypting method into software processing processor, or hardware or mixed circuits. Embodiments of the invention also provide a computer program the instructions of which carry out the steps of such a method, when this computer program is executed on a computer system.

BRIEF DESCRIPTION OF THE DRAWINGS

The new and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 4 is a diagram illustrating the pseudo-random sequence of numbers for an example starting number value of 27, according to the preferred embodiment of the invention;

FIG. 5 is a table showing the distribution pattern of available offsets, for all possible word values with an example word length value of 4 bits, for the 64 first starting numbers which enable all such values, according to the preferred embodiment of the invention;

FIG. 6 is a table showing the distribution pattern of available offsets, for a binary word with an example value of 14, among the 64 first starting numbers which enable all values of binary words with an example length of 4 bits;

FIG. 7 is an histogram showing the distribution of the number of possible starting numbers for ciphering the example binary word of FIG. 6, among the same 64 first starting numbers.

Figure 1:
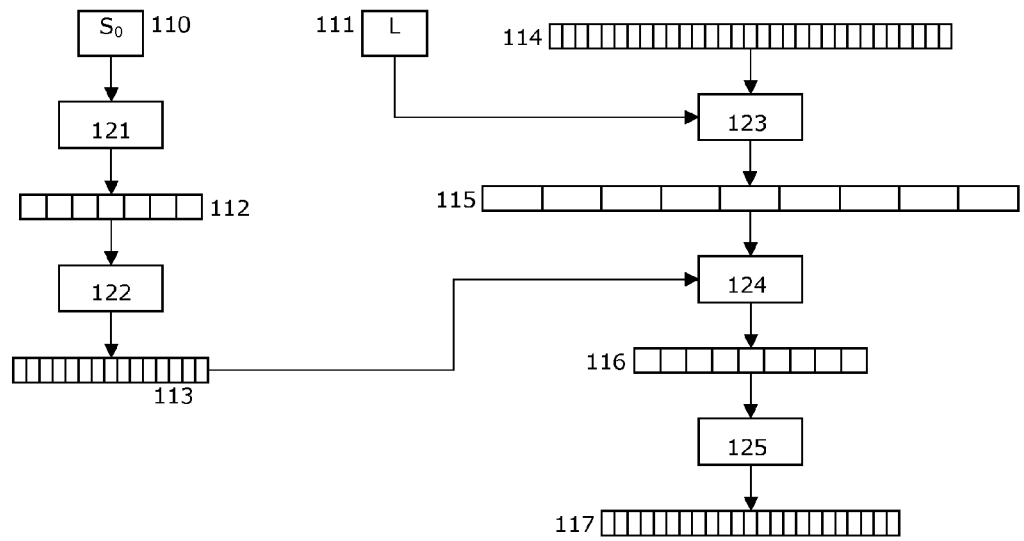
FIG. 1 schematically illustrates the progress of an encrypting process according to the invention.

In the following specifications, elements common to several figures are referenced through a common identifier.

DETAILED DESCRIPTION OF THE INVENTION

A preferred embodiment of the invention is based on a pseudo-random sequence generated by a function of a Collatz type.

Collatz Functions

The original Collatz function is defined as follows:
Consider the following operation on an arbitrary positive integer:
If the number is even, divide it by two.
If the number is odd, triple it and add one.
For example, if this operation is performed on 3, the result is 10; if it is performed on 28, the result is 14. There is an unsolved conjecture in mathematics, based on this function, called the Collatz conjecture. It is named after Lothar Collatz, who first proposed it in 1937. This conjecture is also known as the "3n+1" conjecture, the Ulam conjecture (after Stanislaw Ulam), or the Syracuse problem. This conjecture asks whether a sequence based on the Collatz function, or a certain kind of number sequence, always ends in the same way regardless of the starting number. Paul Erdos said about the Collatz conjecture: "Mathematics is not yet ready for such problems." He offered $500 for its solution.

In mathematical notation, we can define the Syracuse (or Collatz) function "S" in its original form as follows:

$$S(n) = \begin{cases} \dfrac{n}{2}, & \text{if } n \equiv 0[2] \\ 3 \times n + 1, & \text{if } n \equiv 1[2] \end{cases}$$

Starting with an initial number $S_0$, it is possible to generate the sequence of "Syracused Numbers" as defined below, until the value 1 is reached:

$$SN_0 = S_0$$

$$SN_{i+1} = S(SN_i)$$

In the Syracuse conjecture literature, the following jargon is usually adopted:
This sequence $\{SN_i\}$ is known as the flight of S.
Each $SN_i$ is a stage of the flight.
The highest $SN_i$ is known as the maximal elevation of the flight.
The duration of the flight is the number of stages before reaching the value 1.
The flight in elevation is the number of stages before going under the initial value $S_0$.
The expansion factor is the ratio between the maximal elevation and the starting value $S_0$.
Some examples of sequence characteristics for the original Syracuse/Collatz function:

| $S_0$ | duration | Flight in elevation | Maximal elevation | Expansion factor |
|---|---|---|---|---|
| 7 | 16 | 11 | 52 | 7.43 |
| 32 | 5 | 1 | 32 | 1 |
| 27 | 111 | 96 | 9232 | 341.93 |
| 97 | 118 | 3 | 9232 | 95.18 |
| $2^{50}+1$ | 332 | 3 | 3377699720527876 | 3 |
| 871 | 178 | 57 | 190996 | 219.28 |
| 703 | 170 | 132 | 250504 | 356.34 |
| 100759293214567 | 1820 | 166 | 1180174841128253392 | 11712.81 |

This original function may be generalized into a type of functions called Collatz type. A function G is called an Collatz type function if there is an integer n together with rational numbers $\{a_i: i<n\}$, $\{b_i: i<n\}$ such that:

whenever x≡i mod p then $G(x)=a_i x+b_i$ is integral.

The method according to the invention uses a function of Collatz type for generating the pseudo-random sequence of numbers. In a preferred embodiment described hereafter, the following Collatz type function is chosen for generating a pseudo-random sequence of numbers.

$$s(n) = \begin{cases} \dfrac{n}{2}, & \text{if } n \equiv 0[2] \\ \dfrac{3 \times n + 1}{2}, & \text{if } n \equiv 1[2] \end{cases}$$

Some examples of sequence characteristics for this modified Syracuse/Collatz function, as used in the preferred embodiment described hereafter:

| $S_0$ | Flight duration | Flight in elevation | Maximal elevation | Expansion factor |
|---|---|---|---|---|
| 7 | 11 | 6 | 26 | 3.71 |
| 32 | 5 | 1 | 32 | 1 |
| 27 | 70 | 59 | 4616 | 170.96 |
| 97 | 75 | 1 | 4616 | 47.59 |
| 871 | 113 | 34 | 95498 | 109.64 |
| 703 | 108 | 80 | 125252 | 178.17 |

Figure 2:
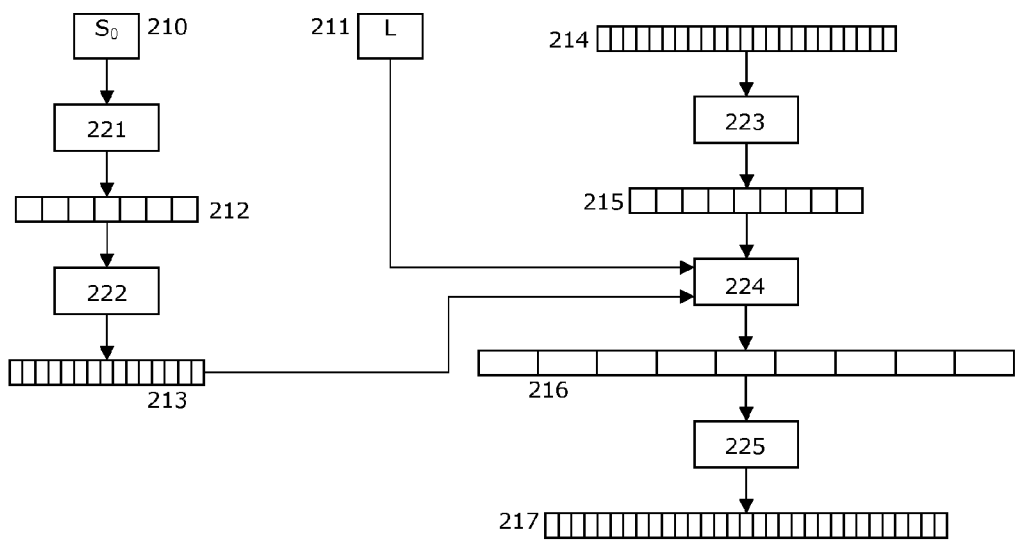
FIG. 2 schematically illustrates the progress of a decrypting process according to the invention.

Applicant assumes that the Syracuse conjecture is true. However, even in the opposite case, such functions nevertheless provide various pseudo-random sequences that are sufficiently numerous for building an encrypting/decrypting method with a good trade-off between security and power or speed performances. FIG. 1 and FIG. 2 respectively illustrate encrypting and decrypting of binary data according to the invention. In FIG. 1, a starting number $S_0$ 110 is used as a secret key for encrypting plain binary data 114 comprising a sequence {bi} of binary bits. This starting number 110 is used as an initial first number for generating 121 and memorizing a pseudo-random sequence of numbers {si} 112, through iteration of the pseudo-random function. The generated pseudo-random sequence 112 of numbers is then processed through a conversion treatment 122, resulting into a pseudo-random sequence 113 of binary digits {sbi}.

Preferably, the conversion treatment 122 comprises the following steps:

if said second number is greater than said first number, adding to the binary pseudo-random sequence a binary digit of a type, e.g. a bit with value "one"; or if said second number is lesser than said first number, adding to the binary pseudo-random sequence a binary digit of the other type, e.g. a bit with value "zero".

The resulting binary pseudo-random binary sequence 113 is then used as a seed for encyphering a sequence {bi} of binary data 114, termed plain data, into a encrypted sequence {cbi} of binary data 117.

This encyphering process comprises the following steps. Plain data 114 is converted 123 into a sequence 115 of consecutive binary words, termed word sequence{wi}, these words being of a length L based on a second key data 111. This second key data may be used as a second secret key, possibly transmitted or detained separately from a first secret key based on the starting number 110. The first 110 and second 111 key data may also be united or combined to form a unique secret key, which then need to be separated before use.

From this word sequence 115, a encrypted sequence 116 of numbers {ni} is generated 124 through replacing each binary word $w_i$ with a number $n_i$ representing one position containing said binary word within the pseudo-random binary sequence 113. The encrypted sequence of number 116 is then converted 125 into a sequence {cbi} of binary data 117, providing the encrypted data 117 issued from the initial plain data 114.

In FIG. 2, a starting number $S_0$ 210 is used as a secret key for decrypting a encrypted binary data 214 comprising a sequence {cbi} of binary bits. In a manner that may be the same as in FIG. 1, a pseudo-random binary sequence 213 is generated 221, 222 from the same starting number 210, which was once used for producing this encrypted binary data 214. The resulting binary pseudo-random binary sequence 213 is then used for decyphering a sequence {cbi} of binary data 214, termed encrypted data, into a plain sequence {bi} of binary data 217.

The decyphering process comprises comes as follows. The encrypted data 214 is read 223 into a sequence of numbers {ni}, termed encrypted sequence 215. A sequence of binary data words {wi}, termed word sequence 216 is generated 224 from the encrypted binary sequence 213. Each number from this encrypted sequence of numbers 215 is used as an offset for selecting a reading position within the pseudo-random binary sequence 213. Starting from this reading position, a binary word is read of a length L corresponding to the same second key data 211, which was once used for producing this encrypted binary data 214.

All the binary words of the resulting word sequence 216 are then concatenated 225 into a sequence of binary data {bi}, termed decrypted data 217, which is then identical to the binary data that was once used for producing the encrypted binary data 214. Although such ciphering and deciphering algorithm provides a good optimization when combined with pseudo-random sequences defined above, different algorithms may also be used for ciphering and deciphering plain data based on using such a pseudo-random binary sequence.

Figure 3:
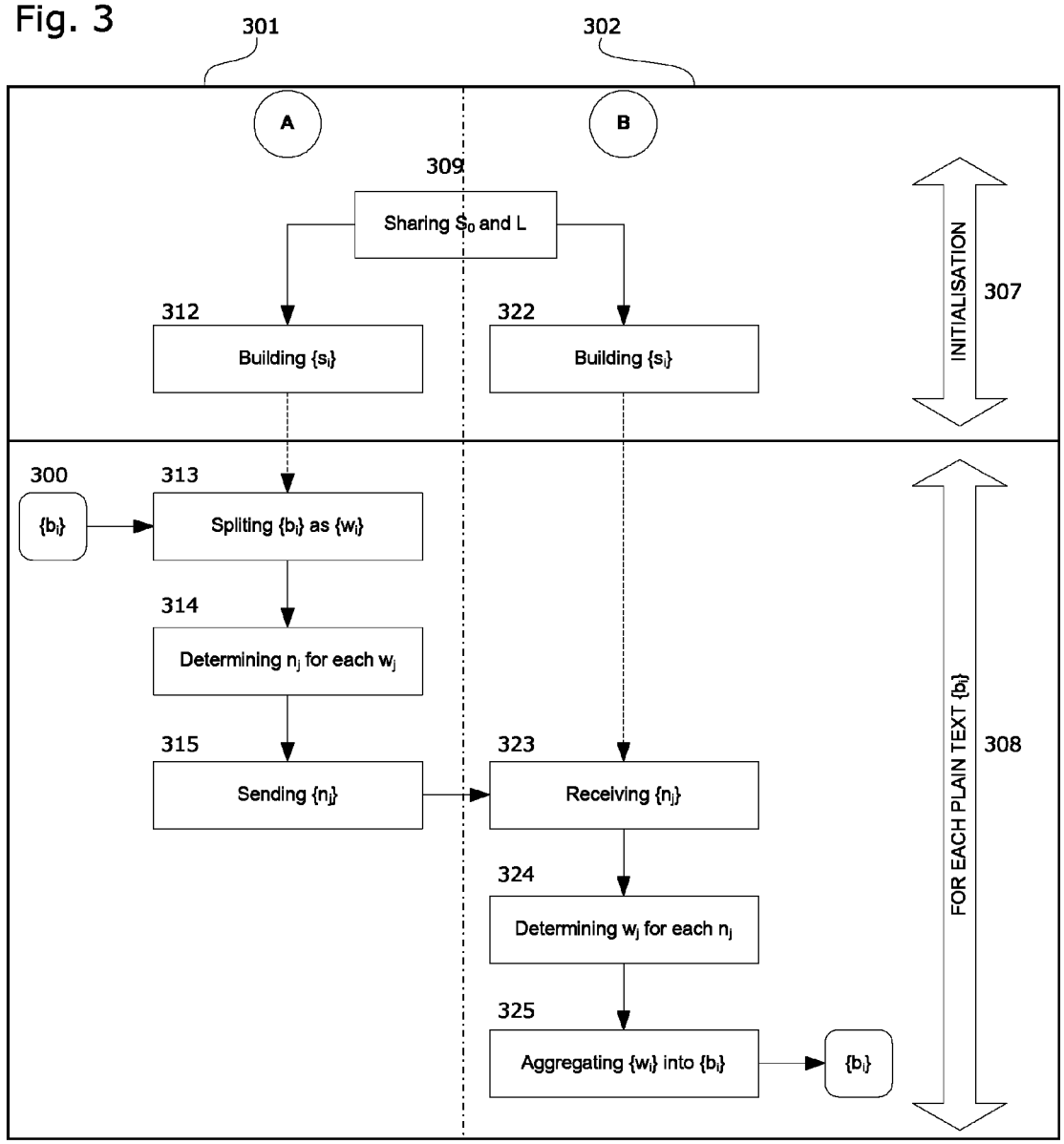
FIG. 3 is a block diagram illustrating an encrypted data transmission method between an emitter and a receiver, according to the invention.

FIG. 3 illustrates more specifically a transmitting process of binary data 300 between an emitting device 301 and a receiving device 302. Two parties "A" 301 and "B" 302 need to exchange a binary information 300 in a secret way. The following assumptions are made and the following notations are used in the rest of this example:

Both parties A and B know 309 a secret key $S_0$.

Both parties A and B know 309 a secret length L.

The binary information 300 to be shared from A to B is represented by a sequences of N bits $\{b_i\}_{i=1}^{i=N}$.

N is a multiple of L

The proposed method for ciphering the binary information is based on the following steps: In an initialisation stage 307, both parties A 301 and B 302 build (312, respectively 322) build the binary pseudo-random sequence $\{s_i\}$ defined by:

$$s_i = \begin{cases} 1, & \text{if } s(n) > s(n-1) \\ 0, & \text{if } s(n) < s(n-1) \end{cases}$$

In its binary form $\{s_i\}$, this sequence specifies the behavior of the Syracuse suite: does it go up (bit at "1") or down (bit at "0") at each successive step?

For each plain data 300 they wish to share, emission from A 301 to B 302 comprises the following steps:

In a processing stage 308, the A party 301 splits 313 the plain text $\{b_i\}_{i=1}^{i=N}$ 300 as a sequence of words $\{w_j\}_{j=1}^{j=N/L}$, defined as:
$w_j\{b_i\}_{i=(j-1)\times L+1}^{i=j\times L}$.

For each word $w_j$, the A party searches 314 in the sequence $\{s_i\}$ a series of L successive bits starting with offset $n_j$ such that: $w_j\{s_i\}_{i=n_j}^{i=n_j+L-1}$. If multiple solutions exist, the A party takes any of them in any way, possibly using a random or pseudo-random selection.

The A party sends 315 to the B party 302 the series $\{n_j\}_{j=1}^{=N/L}$ representing the genuine information $\{b_i\}_{i=1}^{i=N}$ 300, enciphered by the "Syracuse Secret Key" $S_0$.

The B party 302 receives 323 the series $\{n_j\}_{i=1}^{=N/L}$ from the A party.

For each offset $n_j$, the B party reconstructs 324 each word $w_j\{s_i\}_{i=n_j}^{i=n_j+L-1}$.

From the sequence of words $\{w_j\}_{j=1}^{i=N/L}$, the B party reconstructs 325 the original information $\{b_i\}_{i=1}^{i=N}$ 300.

These steps can be implemented in various ways (hardware, software, hybrid), all following the logic described in the diagram of FIG. 3.

A person skilled in the art will easily understand that the proposed method and system asks for very few IT resources for its implementation. The required processing power is very low (simple operations like additions and shifts are needed), and the required memory is also very low (several bytes of ROM memory and few bytes of RAM memory are needed).

Example of a Data Transmission

The secret first key 110, 210 of a value $S_0=27$ is secretly known by both parties A 301 and B 302. FIG. 4 shows the flight corresponding to the pseudo-random sequence 112, 212 generated for this value of "27" for the secret key.

The same pseudo-random binary sequence 113, 213 built by both parties A and B may be written as:
$\{s_i\}$={11011111010110111011110100111011011111
1100111100010101000100111000001001}.

The secret second key 111, 211 of a value L=4 is known by both parties A and B, is used as a length for the words $w_i$ of the word sequence 115.

In this example, the genuine information 300, 114 that party A wants to transmit to party B under a encrypted form is defined as:
$\{b_i\}_{i=1}^{i=N}$={1011111101010110110110110011010
1011101}.

This genuine length N=40 is known by A. Thus, the party A splits 123 this information 300, 114 into a sequence 115 of ten words, each of 4 bits. Each word is then encrypted according to the pseudo-random binary sequence 113.

The party A performs the following operations:
$w_1$={1011}, so that $n_1 \in \{2, 10, 13, 17, 29, 32\}$; the value $n_1$=17 is randomly selected.
$w_2$={1111}, so that $n_2 \in \{4, 5, 19, 34, 35, 36, 42\}$; the value $n_2$=5 is randomly selected.
$w_3$={1010} so that $n_3 \in \{8, 22, 49, 51\}$; the value $n_3$=8 is randomly selected.
$w_4$={1011} so that $n_4 \in \{2, 10, 13, 17, 29, 32\}$; the value $n_4$=10 is randomly selected.
$w_5$={0110} so that $n_5 \in \{11, 30\}$; the value $n_5$=11 is randomly selected.
$w_6$={1101} so that $n_6 \in \{1, 7, 12, 16, 21, 28, 31\}$; the value $n_6$=16 is randomly selected.
$w_7$={1001} so that $n_7 \in \{24, 39, 57, 67\}$; the value $n_7$=24 is randomly selected.
$w_8$={1010} so that $n_8 \in \{8, 22, 49, 51\}$; the value $n_8$=8 is randomly selected.
$w_9$={1101} so that $n_9 \in \{1, 7, 12, 16, 21, 28, 31\}$; the value $n_9$=31 is randomly selected.
$w_{10}$={1101} so that $n_{10} \in \{1, 7, 12, 16, 21, 28, 31\}$; the value $n_{10}$=12 is randomly selected.

Thus, the ciphered information {ni} 116 sent, e.g. under a standard binary form, from A to B is:
$\{n_j\}_{i=1}^{i=N/L}$={17, 5, 8, 10, 11, 16, 24, 8, 31, 12}.

B party receives this sequence, e.g. under its binary form, and uses it as a sequence 215 of offsets for generating the plain binary data 217. Thus, the party B applies each number of the encrypted sequence $\{n_j\}_{i=1}^{i=N/L}$ 215 to the binary form 113, 213 of the pseudo random sequence $\{s_i\}$ 112, 212, for deriving the sequence of words $\{w_j\}_{j=1}^{j=N/L}$ 216. Concatenation of the binary words from this word sequence 216 thus provides a binary sequence 217 identical to the genuine information 300, 114:
$\{b_i\}_{i=1}^{i=N}$={1011111101010110110110110011010
1011101}.

Assume that a third party C wants to break the ciphered information, but ignoring both the secret key $S_0$ and the secret length L. This third party C assumes that the secret key is equal to 91 (wrong choice) and that the secret key is equal to 4 (right choice). Under these assumptions, we have for the party C:
$S_0$=91
$\{s_i\}$={11011101111010011011011111100111
1000101010001001110000001001}
the value $n_1$=17 gives $w_1$={1101},
the value $n_2$=5 gives $w_2$={1101},
the value $n_3$=8 gives $w_3$={1111};
the value $n_4$=10 gives $w_4$={1101};
the value $n_5$=11 gives $w_5$={1010};
the value $n_6$=16 gives $w_6$={1110};
the value $n_7$=24 gives $w_7$={1111};
the value $n_8$=8 gives $w_8$={1111};
the value $n_9$=31 gives $w_9$={1111};
the value $n_{10}$=12 gives $w_{10}$={0100}
The resulting deciphered information is:
{1101110111111010101110111111111110100}
where underscored digits are wrong (18 out of 40).

Thus it can be seen that the ciphered information 117, 214 is indeed a encrypted form af the genuine plain data 114, 217.

According to selected combinations of length L and starting number $S_0$, strength and flexibility of the encryption may vary. Flexibility must be sufficient for encryption of the genuine data intended to be transmitted, i.e. each binary word to be encrypted 115 must be found at least once under its binary form within the generated 122 binary pseudo-random sequence 113. Furthermore, when only one offset exists for such a word, breaking the code may be easier than if several offsets are possible.

Figure 6:
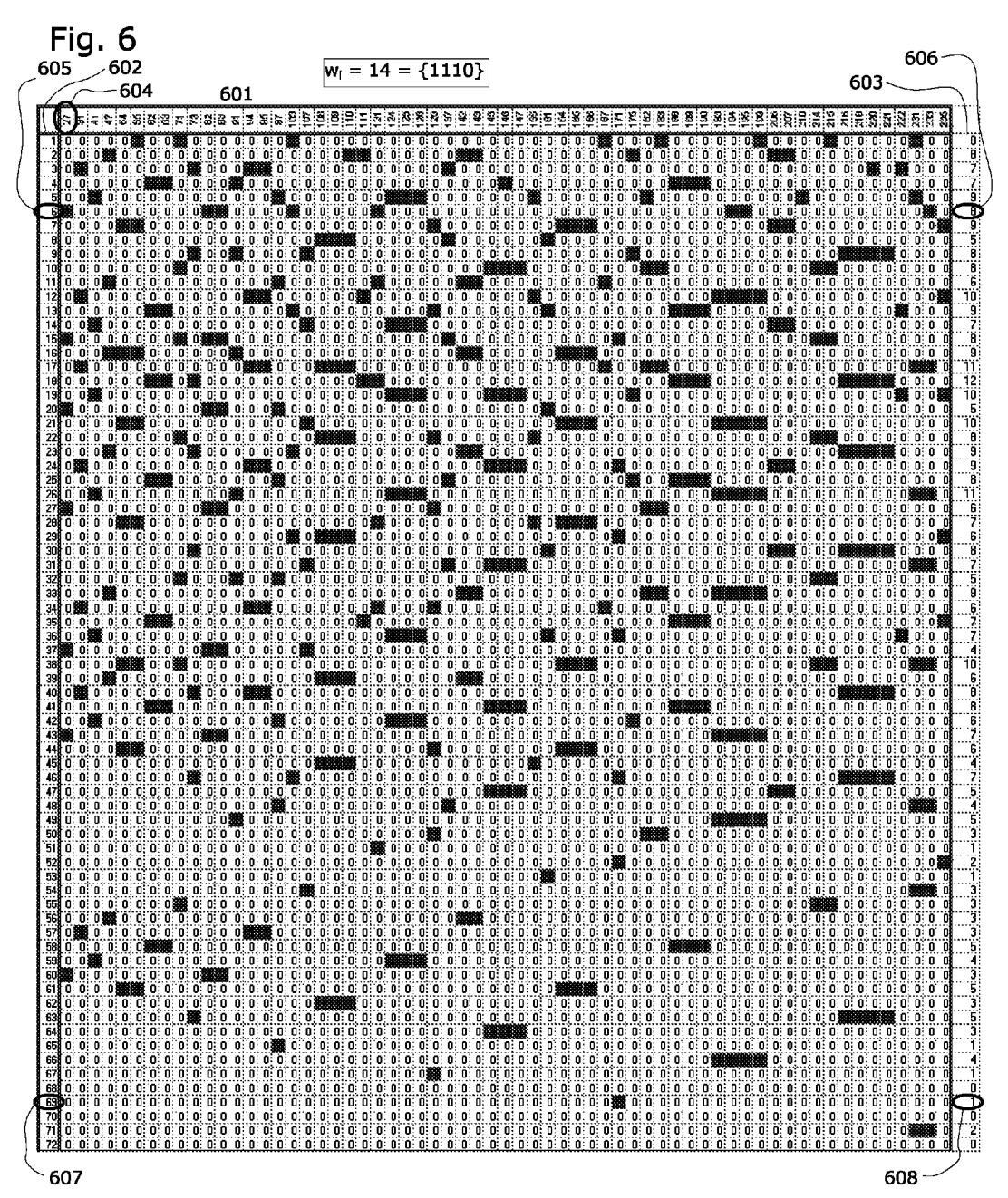

FIG. 5 to FIG. 7 illustrates an example of distribution for the coding possibilities for a word length L of 4 bits. A 4 bits-word may takes 72 different values, ranging from {0000} to {1111}.

Within the pseudo-random binary sequence generated from an integer taken as starting number, it is not always possible to find an offset with every combination of such a 4 bits-word. The more long the word, the harder it becomes. Thus, only a part of the possible keys S0 enable to code any value of such a word. Such keys may be termed "full keys", for a given word length.

FIG. 5 is a table showing a distribution pattern of available offsets, for all possible word values with length value of 4 bits. This table shows the 64 first starting numbers which may be used as full keys for such a word. The top title line 501 shows the values of these 64 first full keys. All possible decimal value of a 4 bits binary word stand in the left title column 502, while the total number of possible offset for each word value stands in the right column 503.

For instance, starting number 27 results in a pseudo-random binary sequence which offers 7 different offsets corresponding to the word {1110}, i.e. with value 14. Also, this word value 14 may be coded in 422 possibilities for the 64 first full keys.

It can be seen that numerous possibilities exist even for starting numbers quite low, thus enabling simple and compact computing or memorizing.

In the table of FIG. 6, cells in grey show the distribution pattern of these 422 available offsets $n_t$ for the same 4-bits word value 14. Offsets from 1 to 72 stand on the left title column 602, while the starting numbers stand on the top title line 601. For instance the offset pattern for the value $SN_0=27$ (ref.604) is equal to the set {6, 15, 20, 27, 37, 43, 60}.

On the right column 603 is reported, for each line, the number of starting numbers that may code this value 14 with the same offset. Thus, the value 14 coded at offset 6 (ref.605) still leaves 8 (ref.606) different possible keys among the 64 first full keys. These 8 possible keys are in the set {27, 82, 83, 103, 121, 194, 195, 233}.

In this specific example, it can be seen that different keys do not result in the same possible offsets, meaning that knowledge of the length and position of one specific word is usually not sufficient for retrieving the secret key. There are only a few similarities between different starting numbers. In this example, there are no more than 4 keys that have a similar distribution pattern (e.g. keys 193, 194, 195, 199). Also, all the possible offset values (on the left) are more or less equally visited, as seen in FIG. 7.

In FIG. 7, offsets from 1 to 72 stand on the bottom line 701, while each bar of the histogram 702 shows the number of possible starting numbers for ciphering the same binary word of value 14, among the same 64 first full keys. This example is one among several simulations that gave similar results, thus indicating an interesting encryption performance when balanced with the low need in power or speed resources.

In a preferred embodiment, selection of any starting number as a key may be validated through checking that this starting number is indeed a full key for the word length selected.

While the invention has been particularly shown and described mainly with reference to a preferred embodiment, it will be understood that various changes in form and detail may be made therein without departing from the spirit and scope of the invention. In other embodiments, for example, possibly combined with the preferred one, starting numbers may be selected as keys even if not a full key. The encrypting method may then comprise a step of changing this key into another, through an algorithm shared between parties, e.g. by automatically selecting the next full key when encountering a word with no available offset in the initial key. Such a key modification may also be triggered on a test issuing a strength quality too low for the selected key, for some words or for all of them. Such a strength quality evaluation may be based on a low number 608 of possible keys for a given word at a given offset 607 of the pseudo-random binary sequence 113, 213.

First and/or second operation may also be changed or modified, for the generation of the whole pseudo-random sequence or in the course of such a generation. Several pseudo-random sequences may also be used together, alternatively or interleaved.

What is claimed is:

1. A method for encrypting data in a computer, the method comprising:
generating, in a computer, at least one pseudo-random sequence of numbers from at least one first key for encrypting data in the computer, generating the pseudo-random sequence of numbers comprising an iteration of:
testing a determined test condition on a first number from the pseudo-random sequence;
in at least a first case of the test condition, applying on the first number a first operation the result of which may present a test condition different from the first number test condition;
in at least a second case of the test condition, applying on the first number a second operation the result of which may present a test condition different from the first number test condition; and
using the result of the first operation or second operation for obtaining a second number, the second number taking a place in the pseudo-random sequence after the first number.

2. The method according to claim 1, wherein generating the pseudo-random sequence of numbers further comprises an iteration of:
from a first number from the pseudo-random sequence, using a function of the Collatz type for calculating a second number of the pseudo-random sequence.

3. The method according to claim 1, wherein the first number is of integer type and checking the test condition comprises calculating parity of the first number, or a value of the first number under a modular comparison.

4. The method according to claim 3, wherein:
the first case occurs when the first number parity is even, and applying the first operation to the first number further comprises dividing the first number by an even integer; and
the second case occurs when the first number parity is odd, and applying the second operation to the first number further comprises multiplying the first number with another integer greater than one, the result of which being then added with one.

5. The method according to claim 4, wherein applying the first operation to the first number further comprises dividing the first number by two.

6. The method according to claim 4, wherein applying the second operation to the first number further comprises multiplying the first number with three, the result of which being then added with one.

7. The method according to claim 1, wherein the result of applying the first operation on the first number is greater than the first number, while the result of applying the second operation on the same first number is less than the same first number.

8. The method according to claim 1, wherein applying the first operation on the first number comprises dividing the first number by a determined number greater than one.

9. The method according to claim 1, wherein applying the second operation on the first number comprises multiplying the first number by another number greater than one, the result of which being further added with an odd number.

10. The method according to claim 1, further comprising:
generating the pseudo-random sequence of numbers from a first key data treated as a initial first number for the pseudo-random sequence of numbers;
processing the pseudo-random sequence of numbers through a conversion treatment resulting into a pseudo-random sequence of binary digits; and applying a encyphering treatment, using the binary pseudo-random sequence as a seed for encrypting computer data.

11. The method according to claim 10, wherein the conversion treatment, at least for a first number and a second number from the pseudo-random sequence of numbers, further comprises:
if the second number is greater than the first number, adding to the binary pseudo-random sequence a binary digit of one type; or
if the second number is less than the first number, adding to the binary pseudo-random sequence a binary digit of the other type.

12. The method according to claim 10, wherein encyphering binary data, termed plain data, into encrypted binary data further comprises:
splitting the plain data into a sequence of consecutive binary words, termed a word sequence, of a length based on a second key data;
generating a sequence of numbers, termed an encrypted sequence, from the word sequence, where at least one binary word from the word sequence is replaced with a number representing at least one position containing the binary word within the pseudo-random binary sequence; and
generating the encrypted binary data from the encrypted sequence.

13. A method for decrypting data in a computer, the method comprising:
generating, in a computer, at least one pseudo-random sequence of numbers from at least one first key for decrypting data in the computer, generating the pseudo-random sequence of numbers comprising an iteration of:
testing a determined test condition on a first number from the pseudo-random sequence;
in at least a first case of the test condition, applying on the first number a first operation the result of which may present a test condition different from the first number test condition;
in at least a second case of the test condition, applying on the first number a second operation the result of which may present a test condition different from the first number test condition; and
using the result of the first operation or second operation for obtaining a second number, the second number taking a place in the pseudo-random sequence after the first number.

14. The method according to claim 13, wherein generating the pseudo-random sequence of numbers further comprises an iteration of:
from a first number from the pseudo-random sequence, using a function of the Collatz type for calculating a second number of the pseudo-random sequence.

15. The method according to claim 13, wherein the first number is of integer type and checking the test condition comprises calculating parity of the first number, or a value of the first number under a modular comparison.

16. The method according to claim 15, wherein:
the first case occurs when the first number parity is even, and applying the first operation to the first number further comprises dividing the first number by an even integer; and
the second case occurs when the first number parity is odd, and applying the second operation to the first number further comprises multiplying the first number with another integer greater than one, the result of which being then added with one.

17. The method according to claim 16, wherein applying the first operation to the first number further comprises dividing the first number by two.

18. The method according to claim 16, wherein applying the second operation to the first number further comprises multiplying the first number with three, the result of which being then added with one.

19. The method according to claim 13, further comprising:
generating the pseudo-random sequence of numbers from a first key data treated as a initial first number for the pseudo-random sequence of numbers;
processing the pseudo-random sequence of numbers through a conversion treatment resulting into a pseudo-random sequence of binary digits; and
applying a decyphering treatment, using the binary pseudo-random sequence as a seed for decrypting computer data.

20. The method according to claim 19, wherein decyphering encrypted binary data into decrypted binary data further comprises:
reading the encrypted data into a sequence of numbers, termed an encrypted sequence;
generating a sequence of binary data words, termed a word sequence, from the encrypted sequence of numbers, where at least one number of the encrypted sequence is used as an offset for reading, whithin the pseudo-random binary sequence, a binary word the length of which is based on a second key data, the number of the encrypted sequence being replaced with the binary word into the word sequence; and
concatenating words of the word sequence into the decrypted data.

21. A system for encrypting or decrypting data in a computer, the method comprising:
a system for generating, in a computer, at least one pseudo-random sequence of numbers from at least one first key for encrypting or decrypting data in the computer, generating the pseudo-random sequence of numbers comprising an iteration of:
testing a determined test condition on a first number from the pseudo-random sequence;
in at least a first case of the test condition, applying on the first number a first operation the result of which may present a test condition different from the first number test condition;
in at least a second case of the test condition, applying on the first number a second operation the result of which may present a test condition different from the first number test condition; and
using the result of the first operation or second operation for obtaining a second number, the second number taking a place in the pseudo-random sequence after the first number.

* * * * *